J. CAMPBELL.
CHURN.

No. 181,311. Patented Aug. 22, 1876.

Witnesses.
William H. Low
John M. O'Brien

Inventor.
John Campbell

UNITED STATES PATENT OFFICE.

JOHN CAMPBELL, OF ALMONTE, ONTARIO, CANADA.

IMPROVEMENT IN CHURNS.

Specification forming part of Letters Patent No. 181,311, dated August 22, 1876; application filed May 29, 1876.

*To all whom it may concern:*

Be it known that I, JOHN CAMPBELL, of Almonte, in the county of Lanark and Province of Ontario, Canada, have invented a new and useful Improvement on Churns, of which the following is a full and exact description, reference being had to the accompanying drawing, making a part of this specification, in which—

Figure 1:
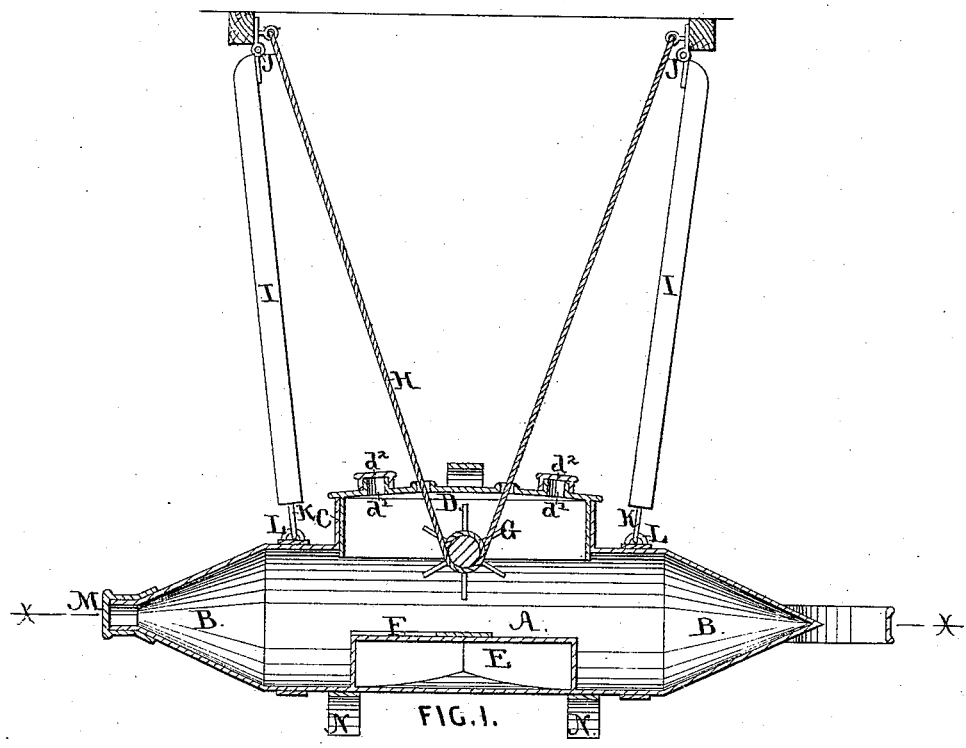
Figure 2:
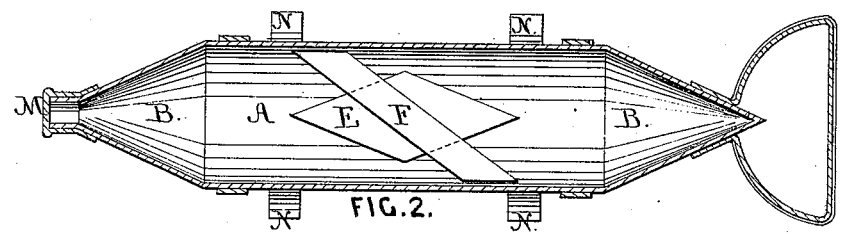

Figure 1 is a longitudinal section, and Fig. 2 a horizontal section at the line X X.

My invention relates to the class of churns that are operated pendulously; and it consists of a cylindrical chamber, terminating in conical ends, and provided with a fixed cream breaker and knife for rupturing the butter-globules of the cream, revolving paddle-wheels for agitating the cream, and ventilating-apertures for aerating the cream and carrying off the impure air and gases therefrom, the cylindrical chamber being suspended by means of hinged links or bars, as herein shown and described, to prevent any lateral movement of the chamber.

As shown in the drawing, A is the cylindrical chamber, terminating in the conical ends B, which, for the purpose of faciliting its construction, I preferably make of sheet metal. On its upper side a rectangular opening, C, is made, for the purpose of pouring the cream into, and removing the butter from, the churn. It is provided with the closely-fitting cover D, having near each of its ends an air-opening, $d^1$, for the induction and eduction of air as the cream is passed from end to end of the cylinder in the operation of churning. These openings are provided with the caps $d^2$, for excluding the dust when the churn is out of use. E is a diamond-shaped block or cream-breaker, secured at the bottom of the chamber A for the purpose of breaking the butter-globules. In performing this office it is materially aided by the diagonal knife F, secured to its upper side. G is a paddle-wheel, whose shaft has its bearings in the rim of the cover D. It receives its motion by means of the cord H, whose ends are secured at or near the points from which the cylinder A is suspended, and from thence passing downward through apertures in the cover D. One or more turns of the cord passes around the shaft of the paddle-wheel, so that with each endwise movement of the cylinder the length of the cord between the shaft and the points of its attachment is alternately lengthened and shortened, and thereby the paddle-wheel is revolved back and forth with each swing of the churn. The cylinder A is suspended by means of the bars I to a frame-work or ceiling, to which they are connected by the hinges J, to prevent any lateral motion being imparted to the bars. At their lower ends the bars I are provided with hooks K, for engaging in the eyes L of the cylinder A to sustain its weight and afford a ready means for disengaging the cylinder from its place when necessary; M, a capped discharge-opening, made at the apex of one of conical ends B, for emptying the buttermilk from the cylinder A. N are legs secured to the cylinder for keeping it in position when removed from its hangings.

In churning, a sufficient quantity of cream is placed within the cylinder A to fill about one-half of the chamber; the caps $d^2$ are removed from the air-openings $d^1$ for the free admission of fresh air into the chamber, and the escape of the impure air and gases therefrom. A steady pendulous motion is then imparted to the cylinder, and the cream contained therein is dashed from one end of the chamber to the other, striking violently in its course against the cream-breaker E and knife F, and thence into the conical ends of the chamber, into whose contracted areas it is driven with such force that the caseous covering, or cell-walls, of the butter-globules are ruptured in a very rapid and perfect manner. This effect is produced by the globules striking against the surface of the conical ends of the chamber, and by the forcible contact of the globules with each other when dashed into the contracted ends of the cones. The motion of the cream in the cylinder expels the air, through the opening $d^1$, from the end of the chamber toward which the mass is moving, and fills the opposite end of the chamber with a supply of fresh air through the other opening; and in striking against the conical ends of the chamber the cream is dashed over backward in curved lines, like broken waves, so that it becomes thoroughly aerated, whereby the time required for producing the butter is materially shortened. The paddle or agitating wheel G, by its rotatory motions, aids in keeping the cream in the chamber in a state of agitation.

It is manifest that butter may be churned by means of the cylindrical chamber, when made with conical ends, without the aid of the cream-breaker E, knife F, and agitating-wheel G, or by omitting either of them, and my invention embraces such modifications; but these devices aid so greatly in reducing the time required for churning the butter, and in increasing the amount produced from a given quantity of cream, that I preferably construct my churns with them.

I claim as my invention—

1. The cylindrical chamber A, having conical ends B, cream-breaker E, and knife F, constructed and arranged to operate as and for the purpose herein specified.

2. The combination, with the cylindrical chamber A, cream-breaker E, and knife F, of the agitating-wheel G, as and for the purpose herein specified.

3. In a pendulously-operating churn, the combination, with the cylindrical chamber A, cream-breaker E, and knife F, of the cover D, provided with the air-opening $d^1$ and agitating-wheel G, when constructed and arranged to operate as and for the purpose herein specified.

JOHN CAMPBELL.

Witnesses:
WILLIAM H. LOW,
JOHN M. O'BRIEN.